United States Patent [19]
Selman

[11] 3,879,366
[45] Apr. 22, 1975

[54] MODIFICATION OF POLYMER-LITHIUM COUPLED WITH POLYHALIDES

[75] Inventor: Charles M. Selman, Bartlesville, Okla.

[73] Assignee: Phillips Petroleum Company, Bartlesville, Okla.

[22] Filed: Apr. 23, 1973

[21] Appl. No.: 353,453

Related U.S. Application Data

[63] Continuation-in-part of Ser. No. 107,579, Jan. 18, 1971, abandoned.

[52] U.S. Cl. ............. 260/94.3; 260/83.7; 260/85.1; 260/93.5 S; 260/93.5 A; 260/94.2 M; 260/94.7 R; 260/94.7 HA; 260/84.1

[51] Int. Cl. ......... C08d 304; C08d 306; C08f 19/08
[58] Field of Search . 260/94.2 M, 94.7 HA, 94.7 A, 260/94.3

[56] References Cited
UNITED STATES PATENTS

| | | | |
|---|---|---|---|
| 2,908,672 | 10/1959 | Jackson | 260/94.2 M |
| 3,163,630 | 12/1964 | Pampus | 260/94.2 M |
| 3,278,508 | 10/1966 | Kahle et al. | 260/94.2 M |
| 3,312,680 | 4/1967 | Kahle et al. | 260/94.2 M |
| 3,429,829 | 2/1969 | Kahle et al. | 260/94.2 M |
| 3,542,716 | 11/1970 | Muller | 260/94.2 |
| 3,595,941 | 7/1971 | Farrar | 260/880 |

*Primary Examiner*—Joseph L. Schofer
*Assistant Examiner*—F. Cervi

[57] ABSTRACT

In the preparation of conjugated diene polymers with multilithium initiators followed by termination with polyfunctional reagents, broader molecular weight distribution is obtained by modifying the polymerization reaction with a magnesium, calcium, strontium, or barium halide or hydrocarbylmetal halide.

21 Claims, No Drawings

MODIFICATION OF POLYMER-LITHIUM COUPLED WITH POLYHALIDES

This application is a continuation-in-part application of copending application Ser. No. 107,579, filed Jan. 18, 1971, now abandoned.

FIELD OF THE INVENTION

This invention relates to the preparation of conjugated diene polymers.

In another aspect, the invention relates to a manner of modifying a polymerization process using multilithium initiators.

Another aspect of the invention is a novel initiator system using Group IIA metal compound modified multilithium initiators.

A broader molecular weight distribution is desired in conjugated diene polymers, including homopolymers, cojugated diene copolymers, and copolymers of conjugated dienes with vinyl aromatic-substituted compounds. Such polymers of broader molecular weight distribution tend to have more desirable processing characteristics such as better bonding on a roll mill, faster and better mixing of compound recipes in an internal mixer, and reduced cold flow.

Furthermore, in application to the multilithium initiator prepared conjugated diene polymers, polyfunctional terminating agents which have at least three reactive sites are utilized so as to provide branched polymers of a radial nature. By the use of such coupling agents which also act as terminating agents, cold flow of the diene polymer is reduced, and processing properties generally improved over the uncoupled polymer, yet gel formation frequently is a problem when such reagents are used.

OBJECTS OF THE INVENTION

It is an object of my invention to provide a method of modification of a lithium initiated polymerization process so as to broaden molecular weight distribution of the resulting polymer.

A further object of my invention is to provide a novel modifier system for multilithium initiators for conjugated diene polymerization processes.

A further object of my invention is the reduction of gel in the coupling of conjugated diene polymers with polyfunctional terminating agents.

SUMMARY OF THE INVENTION

I have discovered that polymerization reactions initiated with multilithium initiators, particularly those subsequently terminated with polyfunctional terminating agents, can be modified effectively by using halides of Group IIA metals, or by using Group IIA organometal halides. The Group IIA metal should have an atomic number of at least 12. The polymer resulting from the process using my modifiers has a broadened molecular weight distribution and can be more effectively coupled in a termination step without production of gel.

DETAILED DESCRIPTION OF THE INVENTION

My additives or modifiers can be represented by the general formula $R_aMX_b$. In this formula R is a hydrocarbyl radical containing from 1 to 20 carbon atoms and can be alkyl, cycloalkyl, aryl, and combinations thereof such as alkaryl, aralkyl, and alkylcycloalkyl. I prefer the alkyl radicals in general, and more preferably those in which the alkyl has up to about 10 carbon atoms per R group. M is a metal of Group IIA of the Periodic Table with an atomic number of at least 12 and is magnesium, calcium, strontium, or barium. X is a halogen, and can be fluorine, chlorine, bromine, or iodine. The Periodic Table is as shown in the *Handbook of Chemistry and Physics*, 49th Edition, The Chemical Rubber Co. (1968–1969) page B-3.

In the $R_aMX_b$ modifiers, $a$ is either 0 or 1, of course, since the metal halides themselves are effective modifiers. The other integer designator, $b$, will be either 1 or 2, necessarily being 1 when $a$ is 1, or 2 when $a$ is 0. When $b$ is 2, then X is not limited to a single halogen, but could represent two differing halogen atoms in the molecule.

Examples of suitable $R_aMX_b$ modifiers include barium chloride, barium iodide, n-butylbarium fluoride, magnesium chloride, magnesium bromide, magnesium iodide, methylmagnesium chloride, cyclohexylmagnesium bromide, eicosylmagnesium iodide, phenylmagnesium bromide, benzylmagnesium chloride, 4-tert-butylcyclohexylmagnesium fluoride, 3-phenylcyclopentylmagnesium chloride, n-butylcalcium iodide, eicosylcalcium bromide, calcium chloride, calcium bromide, calcium fluoride, calcium iodide, phenylstrontium chloride, cyclohexylstrontium bromide, strontium bromide, ethylbarium chloride, phenylbarium bromide, barium fluoride, and the like.

These modifiers are used in polymerizations initiated with multilithium initiators. The multilithium initiators can be represented by the general formula $R'Li_x$. R' is a polyvalent hydrocarbyl radical with a valence equal to the value of $x$, and $x$ is an integer of from 2 to 6 inclusive. R can be an aliphatic, cycloaliphatic, or aromatic radical, and can contain from 1 to 20 carbon atoms per polyvalent hydrocarbyl radical.

Preferred multilithium initiators are those obtained by the reaction of lithium or an organomonolithium compound such as n-butyllithium or sec-butyllithium with a divinyl aromatic hydrocarbon such as 1,4-divinylbenzene or 1,4-divinylnaphthalene which can, if desired, be in the presence of a small amount of a solubilizing conjugated diene of from 4 to 12 carbon atoms per such diene.

Other suitable multifunctional lithium initiators include the lithium metal adducts of conjugated dienes such as isoprene or other diene of 4 to 12 carbon atoms, or the dilithium adducts of fused-ring aromatic hydrocarbons such as naphthalene or other aromatic hydrocarbons of from about 12 to 30 carbon atoms.

Suitable polylithium compounds include 9,10-dilithioanthracene; 2,2',2''-trilithio-p-terphenyl; 1,12-dilithiododecane; 1,2-dilithio-1,2-diphenylethane; 1,4-dilithiocyclohexane; and the like.

The amount of my $R_aMX_b$ additive or modifier employed according to my invention can vary widely, depending on the degree of modification desired, the type of polymerization, whether a polar compound is employed as randomizing agent, and the like. The amount of modifier employed according to my invention can be expressed in terms related to the amount of the multilithium initiator used in the polymerization process. The initiator itself normally is employed in an amount of from 0.1 to 100 milliequivalents of lithium per 100 grams of monomer or monomers employed.

The amount of modifier employed generally is from 1.25 to 10 millimoles of modifier per milliequivalent of lithium in the initiator employed for homopolymerization of a conjugated diene, or copolymerization of two or more conjugated dienes; or for block copolymerization processes employing one or more conjugated dienes with one or more copolymerizable monovinyl-substituted aromatic hydrocarbons, i.e., in the absence of a polar compound randomizing agent. I presently prefer to employ not less than about 2.5 meq, milliequivalents of lithium per 100 g of monomer(s) employed in such polymerizations.

When employing a random copolymerization process employing one or more conjugated dienes with one or more monovinyl-substituted aromatic hydrocarbons in the presence of a polar compound as a randomizing agent, the amount of modifier employed can range lower, generally from about 0.75 to 10 millimoles of modifier per milliequivalent of lithium in the initiator employed. I presently prefer, in such random copolymerizations, to employ not less than about 1.5 meq of lithium.

I have found, with either type of polymerization, that to prepare gel-free coupled polymers that it is desirable to use toward the higher ratio of the range relative to the amount of lithium charged as the amount of lithium itself is reduced. In other words, as the amount of lithium approaches the lower end of the utilizable range, the amount of modifier utilized should be increased toward the higher range.

The modifiers of my invention can be charged to the polymerization mixture prior to initiation of polymerization, or during the polymerization reaction but prior to substantial completion of the polymerization reaction. My additives or modifiers can be charged initially, or incrementally during a portion of or all of the polymerization reaction, or continuously during a portion of or during substantially all of the polymerization reaction interval. Of course, a portion of the additive amount employed can be added prior to initiation, the remainder in one or more portions incrementally or continuously after polymerization is commenced. By prior to substantial completion of the polymerization reaction, as the phrase is employed herein, I mean prior to about 75 weight percent conversion of monomer or monomers present in the polymerization reaction. It presently is preferred that the modifier be charged initially, e.g., before addition of or substantially with, or very shortly after addition of the initiator to the polymerizable monomers. Appreciable delay in addition of the modifier to the polymerization system in some instances results in gel in the coupled polymers rather than gel-free coupled polymers.

The monomers which can be employed in a process according to my invention are those known to polymerize with lithium initiator systems. Such monomers include the particularly useful conjugated dienes of from 4 to 12 carbon atoms per molecule, preferably those of from 4 to 8 carbon atoms per molecule, as well as the vinyl-substituted aromatic compounds of from 8 to 20 carbon atoms per molecule, preferably those of from 8 to 12 carbon atoms per molecule. Copolymers of conjugated dienes with vinyl-substituted aromatic compounds also can be prepared according to the process of my invention modified with my modifiers.

Examples of suitable monomers include the preferred butadiene, isoprene, styrene, and copolymers of any two thereof, as well as 2,3-dimethyl-1,3-butadiene, piperylene, 3-butyl-1,3-octadiene, 2-phenyl-1,3-butadiene, 1-vinyl-napthalene, 3-methylstyrene, 4-cyclohexylstyrene, 4-dodecylstyrene, 2-ethyl-4-benzylstyrene, 4-tert-butylstyrene, 4-isopropylstyrene, and the like. Not only can mixtures of two or more monomers be employed, but sequential addition of and hence sequential polymerization of different monomers also can be utilized with the initiators modified with my modifiers.

Polymerization temperature generally employed will be from $-50°$ C. to $+150°$ C., more usually from $-10°$ C. to $+75°$ C. Pressures employed usually are at least sufficient to maintain a substantial portion of the reaction mixture in a liquid phase. It is preferred that the polymerization reactions be carried out in the presence of a suitable diluent, usually inert hydrocarbon compounds containing from 4 to 12 carbon atoms per molecule or mixtures thereof. Mixtures of hydrocarbons with polar compounds such as ethers, thioethers, and tertiary amines of from 2 to 30 carbon atoms per molecule, also are suitable.

Various other prior art additives can be used within the process, such as the alkali metal alkoxides to promote the formation of random copolymers of conjugated dienes and vinyl aromatic hydrocarbons when mixtures of such monomers are polymerized with mul-tilithium initiators and hydrocarbon diluents such as by the process described in U.S. Pat. No. 3,294,768, issued Dec. 27, 1966, to C. F. Wofford.

The polymers produced according to the process of my invention using multilithium initiators with the polymerization process modified by the organometal halides or metal halides of Group IIA are coupled with agents as described in U.S. Pat. No. 3,281,383 issued Oct. 25, 1966, to R. P. Zelinski and Henry L. Hsieh. The polyfunctional treating agents are added to the unquenched polymerization reaction mixture, preferably as soon as feasible after the polymerization reaction is substantially complete, i.e., the desired degree of conversion of monomers has been reached. Such coupling agents must be added prior to the addition of any other material such as water, acid, alcohol, or other material tending to inactivate or remove active lithium atoms present in the polymer, though minor amounts often are present with the coupling agent and are not objectionable. Temperature of the coupling reaction can vary over a broad range, and is conveniently that used for the polymerization itself. Temperatures above about $35°$ C. are preferred for more rapid reaction, since, under such conditions, reaction normally occurs as soon as materials are blended and the time is quite short being from one minute to one hour approximately. Longer reaction intervals are satisfactory, and often are required at lower temperatures. However, relatively long reaction times at elevated temperatures, e.g., such as one hour at $70°$ C., are to be avoided, since gelled polymer can result in some instances. One skilled in the polymer arts can readily adjust time and temperature of coupling my modified polymerizations to reach the desired gel-free coupled polymers.

The polyfunctional treating agent itself contains at least three reactive sites which are capable of reacting with a lithium carbon bond in the polymer, and thereby resulting in the coupling of the reagent to the polymer. These treating agents include polyepoxides, polyisocyanates, polyimines, poly aldehydes, polyketones, polyanhydrides, polyesters, polyhalides. Mixtures of two or more such coupling agents can be utilized where desired.

While any polyepoxide can be used, preferred are those which are liquid since they can be readily handled and also since they form a relatively small nucleus for the radial polymer. Especially preferred among the polyepoxides are the epoxidized hydrocarbon polymers such as epoxidized liquid polybutadiene and the epoxidized vegetable oils such as epoxidized soybean oil and epoxidized linseed oil. Other epoxy compounds such as 1,2;5,6;9,10-tri-epoxydecane, and the like, also can be used.

The polyisocyanates are preferably those compounds represented by the formula $R''(NCO)_m$ where $R''$ is a polyvalent organic radical which can be aliphatic, cycloaliphatic, or aromatic, and contains from 2 to 30 carbon atoms, and m is an integer of 3 or more, preferably 3 or 4. Examples of such compounds include benzene-1,2,4-triisocyanate, naphthalene-1,2,5,7-tetraisocyanate, triphenylmethane-triisocyanate, naphthalene-1,3,7-triisocyanate, and the like. Especially suitable is a commercially available product known as PAPI-1. This material is a polyarylpolyisocyanate having an average of 3 isocyanate groups per molecule and an average molecular weight of about 380. Structurally the compound can be represented by a series of isocyanate-substituted benzene rings joined through methylene linkages.

The polyimines which are also known as polyaziridinyl compounds preferably are those containing 3 or more aziridine rings as represented by the formula:

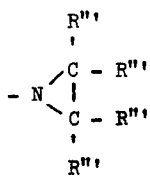

wherein each $R'''$ can be hydrogen, or an alkyl, aryl or cycloalkyl radical or combination of such hydrocarbon radicals, the total of the $R'''$ groups containing up to 20 carbon atoms. The aziridine rings can be attached to a carbon, phosphorous or sulfur atom. Examples of these compounds are the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, tri(2-phenyl-1-aziridinyl)phosphine oxide, tri(2-methyl-3-cyclohexyl-1-aziridinyl)phosphine sulfide, and the like. Also suitable are the triaziridinyl substituted triazines and the triphosphatriazines containing 3, 4, 5 or 6 aziridinyl substituted rings. Examples of these compounds include 2,4,6-tri(aziridinyl)1,3,5-triazine, 2,4,6-tri(2-methyl-1-aziridinyl)1,3,5-triazine, 2,4,6-tri(1-aziridinyl)-2,4,6-triphospha-1,3,5-triazine, 2,4,6-tri(2-methyl-n-butyl-aziridinyl)2,4,6-triphospha-1,3,5-triazine, and the like.

The polyaldehydes are represented by compounds such as 1,4,7-naphthalene tricarboxyaldehyde, 1,7,9-anthracene tricarboxyaldehyde, 1,1,5-pentane tricarboxyaldehyde and similar polyaldehyde-containing aliphatic and aromatic compounds. The polyketones are compounds such as 1,4,9,10-anthracenetetrone, 2,3-diacetonylcyclohexanone, and the like. Examples of the polyanhydrides include pyromellitic dianhydride, styrene-maleic anhydride copolymer, and the like. Examples of the polyesters include the glycerol tristearates, glycerol trioleates and similar compounds.

Among the polyhalides, preferred are the silicon tetrahalides such as silicon tetrachloride, silicon tetrabromide and silicon tetraiodide, and the trihalosilanes such as trifluorosilane, trichlorosilane, trichloroethylsilane, tribromobenzylsilane, and the like. Also preferred are the polyhalogen substituted hydrocarbons such as 1,3,5-tri(bromoethyl)-benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents which are inert with respect to lithium atoms in the terminally reactive polymer also can be present in the active halogen containing compounds. Alternatively, other suitable reactive groups different from the halogen as described above can be present. Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2;4,5-diepoxy-3-hexanone, 1,2,;11,12-diepoxy-8-pentadecanone, 1,3;18,19-diepoxy-7,14-eicosanedione, and the like. Specifically preferred polyfunctional terminating agents include silicon tetrachloride, stannic chloride, and polyepoxides such as epoxidized linseed oil.

The amount of polyfunctional treating agent used is in the range of from 0.1 to 1.5 equivalents of the treating agent per equivalent of lithium present in the polymer. The optimal amount for maximum branching is 1 equivalent of treating agent. Larger amounts can be employed, if desired, since such usage encourages the production of polymers containing terminally reactive groups, or encourages coupling only the linear polymer instead of branched polymer. Lower molecular weight linear polymer can be produced along with higher molecular weight radial polymer when the amount of treating agent is insufficient to provide maximum branching.

After the polymers have been reacted with the polyfunctional compound, the resulting coupled polymer can be recovered by any means known by the art, such as by treatment with materials containing active hydrogen including alcohol, acid, or mixtures of such reagents.

EXAMPLES

The following examples demonstrate the use of the modifiers according to my invention. The examples, and specific reactants used therein, are intended to be illustrative of my invention, and not limitative of the scope thereof.

EXAMPLE I

Runs were made in which 1,3-butadiene was polymerized with a multilithium compound. The multilithium compound was prepared by reacting divinylbenzene with sec-butyllithium at a mole ratio of 0.55:1 respectively. Certain of the runs were made according to the invention in that a modifier of the invention, magnesium chloride, also was present in the polymerization system. Suitable control runs were made. Some of the runs were terminated with a polyfunctional agent, silicon tetrachloride, as a part of the procedure of this invention. The properties of the polymers obtained from each of these runs were then determined.

Polyermization Recipe

|  | Parts by Weight |
|---|---|
| Cyclohexane | 975 |
| 1,3-Butadiene | 100 |
| Multilithium compound (mehm[a]) | (2.5) |
| $MgCl_2$ | variable |
| Temperature, °C | 70 |
| Time, hours | 2 |
| Silicon tetrachloride | variable |

[a]mehm = milliequivalents of lithium per 100 g of monomer(s).

In each of the runs, cyclohexane was charged to the reactor first followed by butadiene. The multilithium initiator next was charged, followed by the magnesium chloride 0.25 M in toluene diluent. The temperature was adjusted to 70° C. and the polymerization reaction continued for 2 hours. To certain of the runs further identified below, silicon tetrachloride was added as a terminating agent allowed to react for 1 hour at 70° C., except Runs 10, 11, and 12, where the time was 1 ½ to 1 ¾ hours instead of 1 hour. Each run was charged with a 10 weight percent solution of an antioxidant, 2,2'-methylene-bis(4-methyl-6-tert-butylphenol), in a 50:50 by volume mixture of isopropyl alcohol and toluene with the amount added being sufficient to provide about one part by weight of the antioxidant per 100 parts by weight of the polymer. Each polymerization mixture was coagulated with isopropyl alcohol and the polymer separated and dried. The results of these runs are shown below in Table I.

pared in the presence of $MgCl_2$ but without $SiCl_4$ termination. Run 2 demonstrates the properties of a polymer prepared with a multilithium initiator in the absence of an additive of my invention but terminated with $SiCl_4$. Runs 10, 11, and 12 illustrate the desirability of avoiding too long a coupling time at elevated coupling temperatures.

The results in Table I, runs 4 through 9 inclusive, clearly demonstrate that the use of a modifier, $MgCl_2$, of this invention provides a gel-free polymer with a broadened molecular weight distribution, i.e., larger heterogeneity index than a polymer made in the absence of an additive according to my invention.

EXAMPLE II

Additional runs were conducted in which butadiene was polymerized with the multilithium initiator as described in Example I.

Polymerization Recipe

|  | Parts, by weight |
|---|---|
| Cyclohexane | 780 |
| 1,3-Butadiene | 100 |
| Multilithium compound (mehm) | 3.0[a] |
| $MgCl_2$ (0.7M in toluene diluent) | variable |
| Temperature, °C | 70 |
| Time, hours | 2 |
| Silicon tetrachloride | variable |

[a]except runs 21-23 inclusive employing only 2.0 mehm initiator.

The charging procedures and polymer isolation procedures in these runs were the same for Runs 13 to 17 inclusive as those employed in Example I. The charging and isolation procedures for Runs 18-19 also were the

Table I

| Run No. | Modifier $MgCl_2$[d] mhm | Polyfunctional Agent $SiCl_4$[d] mhm | Ratio[a] $MgCl_2$:Li | Inherent[b] Viscosity | Gel[b] % | Hetero-[c] geneity Index |
|---|---|---|---|---|---|---|
| 1 | 0 | 0 | — | 0.85 | 0 | 1.18 |
| 2 | 0 | 0.625 | — | 1.51 | 34 | 3.4[e] |
| 3 | 3.35 | 0 | — | 0.83 | 0 | 1.20 |
| 4 | 3.13 | 0.625 | 1.25 | 2.11 | 0 | 4.9 |
| 5 | 3.35 | 0.625 | 1.34 | 2.36 | 0 | 4.8 |
| 6 | 3.58 | 0.625 | 1.43 | 1.76 | 0 | 4.0 |
| 7 | 4.17 | 0.625 | 1.67 | 1.49 | 0 | 4.0 |
| 8 | 5.00 | 0.625 | 2.00 | 1.71 | 0 | 3.7 |
| 9 | 6.25 | 0.625 | 2.50 | 1.74 | 0 | 3.7 |
| 10 | 2.00 | 0.625 | 0.8 | 1.75 | 34 | — |
| 11 | 2.50 | 0.625 | 1.0 | 2.26 | 28 | — |
| 12 | 3.35 | 0.625 | 1.34 | 1.99 | 25 | — |

[a]Ratio of millimoles of $MgCl_2$ per milliequivalent of lithium in the initiator charged.
[b]Determined according to the procedure of U.S. Patent 3,278,508, Col. 20, notes a and b.
[c]The ratio of weight average molecular weight (Mw) to number average molecular weight (Mn) as determined by gel permeation chromatography (GPC).
[d]mhm = gram millimoles per 100 g of monomer(s).
[e]Determined on the soluble (in tetrahydrofuran) portion of the polymer.

Runs 1, 2, and 3 of Table I are control runs. Run 1 demonstrates the properties of a polymer prepared in the absence of $MgCl_2$ addition and $SiCl_4$ termination. Run 3 demonstrates the properties of a polymer presame as for Example I except that the addition of the modifier was delayed until after substantial polymerization had occurred. The results of these runs are shown below in Table II.

Table II

| Run No. | $MgCl_2$ mhm | $SiCl_4$ mhm | Ratio $MgCl_2$:Li | Inherent Viscosity | Gel % | Heterogeneity Index |
|---|---|---|---|---|---|---|
| 13 | 0 | 0 | — | 0.75 | 0 | 1.17 |
| 14 | 0 | 0.65 | — | 2.02 | 37 | — |
| 15 | 3.0 | 0.65 | 1.0 | 1.89 | 27 | — |
| 16 | 3.75 | 0.65 | 1.25 | 1.91 | 0 | 5.7 |
| 17 | 5.0 | 0.65 | 1.67 | 1.71 | 0 | 4.8 |
| 18 | 2.50 | 0.65 | 1.00 | 1.49 | 39 | — |
| 19 | 3.15 | 0.65 | 1.26 | 1.45 | 31 | — |
| 20 | 4.20 | 0.65 | 1.68 | 1.84 | 37 | — |

Table II—Continued

| Run No. | MgCl$_2$ mhm | SiCl$_4$ mhm | Ratio MgCl$_2$:Li | Inherent Viscosity | Gel % | Heterogeneity Index |
|---|---|---|---|---|---|---|
| 21 | 2.00 | 0.40 | 1.00 | 1.74 | 21 | — |
| 22 | 2.50 | 0.40 | 1.25 | 2.09 | 22 | — |
| 23 | 3.35 | 0.40 | 1.67 | 2.51 | 5 | — |

The results in Table II again demonstrate that the use of an additive of this invention provides a gel-free polymer of broad molecular weight distribution. The results further show the desirability of using a proper ratio of MgCl$_2$:Li so that gel-free polymers may be produced. Runs 18–20 inclusive further indicate that the modifier preferably is added initially to the polymerization reaction mixture as in Runs 13–17 inclusive. Runs 21–23 inclusive further illustrate that in these types of polymerizations conducted in the absence of a polar compound as randomizer, that it is preferable to adjust the level of multilithium initiator employed in order to reach the desired gel-free coupled polymer.

EXAMPLE III

Additional runs were conducted in which butadiene was copolymerized with styrene in the presence of a multilithium initiator and a randomizing agent.

Polymerization Recipe

|  | Parts by Weight |
|---|---|
| Cyclohexane | 624 |
| 1,3-Butadiene | 75 |
| Styrene | 25 |
| Multilithium Initiator (mehm) | variable |
| Potassium-tert-butoxide (0.09 N in toluene) | variable |
| MgCl$_2$ (0.7 N in toluene diluent) | variable |
| Temperature °C. | 70 |
| Time, hours | 2 |
| Silicon tetrachloride | variable |

In each of the runs, cyclohexane was charged to the reactor first, followed by butadiene and styrene. The multilithium initiator (made by reacting divinylbenzene with sec-butyllithium at a mole ratio of 0.25:1) was next added, followed by the randomizer potassium-tert-butoxide, and finally the magnesium chloride. This mixture was adjusted to 70° C. and reacted for two hours. To certain of the runs, silicon tetrachloride was added and reacted as before described iin Example I. The polymer was worked-up and recovered as before described. Results are as shown below:

Table III

| Run No. | MgCl$_2$ mhm | SiCl$_4$ mhm | Ratio MgCl$_2$:Li | Inherent Viscosity | Gel % |
|---|---|---|---|---|---|
| 24 | 0 | 0.5 | — | 2.29 | 0 |
| 25 | 0 | 0.0 | — | 0.91 | 0 |
| 26 | 0 | 0.5$^{(a)}$ | — | 2.35 | 6 |
| 27 | 2.00 | 0.5 | 1.00 | 2.10 | 0 |
| 28 | 2.50 | 0.5 | 1.25 | 2.01 | 0 |
| 29 | 3.32 | 0.5 | 1.66 | 2.01 | 0 |
| 30 | 5.00 | 0.5 | 2.50 | 1.68 | 0 |
| 31 | 10.00 | 0.5 | 5.00 | 1.51 | 0 |

$^{(a)}$SiCl$_4$ did not appear to mix well with this reaction mixture.

Table IV (Using 1.75 mehm multilithium initiator, and 0.17 mhm potassium-tert-butoxide)

| Run No. | MgCl$_2$ mhm | SiCl$_4$ mhm | Ratio MgCl$_2$:Li | Inherent Viscosity | Gel % |
|---|---|---|---|---|---|
| 32 | 0 | 0.44 | — | 2.40 | 10 |
| 33 | 0 | 0 | — | 1.05 | 0 |
| 34 | 0 | 0.44$^{(a)}$ | — | 2.67 | 14 |
| 35 | 1.72 | 0.44 | 1.00 | 2.24 | 0 |
| 36 | 2.20 | 0.44 | 1.25 | 2.15 | 0 |
| 37 | 2.92 | 0.44 | 1.66 | 2.11 | 0 |
| 38 | 4.36 | 0.44 | 2.48 | 1.97 | 0 |
| 39 | 8.80 | 0.44 | 5.00 | 1.62 | 0 |

$^{(a)}$SiCl$_4$ did not appear to mix well with this reaction mixture.

Runs 27 to 31 inclusive (Table III) and 35 to 39 inclusive (Table IV) of the invention demonstrate the use of the modifier permits the consistent production of gel-free coupled polymers. The modifier is especially important at lower initiator levels as reflected by Runs 35 to 39 inclusive of the invention.

Polymeric products prepared according to the process of my invention subsequently can be vulcanized by normally employed compounding recipes so as to provide molded rubber articles, and the like. Formulations can contain carbon black, or other reinforcing agents, as well as extending materials such as various extender oils and plasticizers. These polymers can be employed in admixture with other polymers, rubbery or plastic in nature, depending upon the final use intended.

In my description, including examples, I have shown the beneficial results obtained from the modified polymerization process according to my invention, using the modifiers as described. Variations and modifications of my invention can be made, as will be apparent to one skilled in the art, yet without departing from the intended scope and spirit of my diclosure including the claims as here appended.

I claim:

1. In a process for preparing gel-free coupled polymers wherein at least one polymerizable monomer is polymerized with a multilithium initiator and wherein a polyfunctional coupling agent containing at least three reactive sites capable of reacting with a lithium-carbon bond in a polymer is added in an effective amount to the polymerization reaction after initiation of said polymerization of said monomer with said multilithium initiator and prior to quenching of said polymerization reaction, thereby coupling said polymer, and wherein said polymerizable monomer is at least one conjugated diene, at least one monovinyl-substituted aromatic compound, or both, the improvement which comprises the addition to the polymerization reaction, after charging of said polymerizable monomer and said multilithium initiator, of a Group IIA metal halide or hydrocarbylmetal halide modifier wherein the Group IIA metal thereof is magnesium, calcium, strontium, or barium, and wherein said modifier is employed in a range of about 1.25 to 10 millimoles of said modifier per equivalent of lithium in said multilithium initiator;

wherein said multilithium initiator is a lithium metal adduct of a conjugated diene, a dilithium adduct of a fused ring aromatic hydrocarbon, or is represented by $R'Li_x$ wherein $R'$ is a polyvalent hydrocarbyl radical with a valence equal to the value of $x$.

2. The process according to claim 1 wherein said modifier is added to said polymerization reaction at least one of incrementally and substantially continuously during at least a portion of said polymerization reaction.

3. The process according to claim 1 wherein said modifier can be represented by $R_aMX_b$ wherein each R represents a hydrocarbyl radical containing up to 20 carbon atoms and each R is individually selected from alkyl, cycloalkyl, aryl, or combination, M is said metal of Group IIA, X is a halogen and is fluorine, chlorine, bromine, or iodine, $a + b$ equals 2 and $a$ is 0 or 1, and wherein said polyfunctional treating agent is added to said polymerization reaction after polymerization of said monomer with said multilithium initiator is substantially complete and prior to quenching.

4. The process according to claim 3 wherein said polyfunctional coupling agent containing at least three reactive sites is a polyepoxide, polyisocyanate, polyimine, polyaldehyde, polyketone, polyanhydride, polyester, polyhalide, or mixture, and is employed in a range of 0.1 to 1.5 equivalents of said polyfunctional treating agent per equivalent of lithium.

5. The process according to claim 1 employing at least about 2.5 milliequivalents of lithium per 100 gram of monomer employed in such polymerization.

6. A process according to claim 5 wherein said polymerization reaction is carried out in the presence of a diluent selected from hydrocarbons containing 4 to 12 carbon atoms per molecule, ethers, thioethers, tertiary amines of 2 to 30 carbon atoms per molecule, and mixtures thereof.

7. A process according to claim 3 wherein further is employed in said polymerization reaction an alkali metal alkoxide.

8. The process according to claim 4 wherein said multilithium initiator is said $R'Li_x$ wherein $R'$ contains up to 20 carbon atoms, has a valence equal to $x$, and is aliphatic, cycloaliphatic, aromatic, or combination, $x$ is an integer of 2 to 6 inclusive, and wherein said multilithium initiator is employed in said polymerization process in an amount of 0.1 to 100 milliequivalents of lithium per 100 grams of polymerizable monomer.

9. The process according to claim 8 wherein said polymerizable conjugated diene contains 4 to 12 carbon atoms per molecule and said polymerizable vinyl-substituted aromatic compound contains 8 to 20 carbon atoms per molecule.

10. The process according to claim 9 wherein said polyepoxides are liquid epoxidized hydrocarbon polymers; said polyisocyanates can be represented by the formula $R''(NCO)_m$ wherein $R''$ is a polyvalent organic radical and is aliphatic, cycloaliphatic, or aromatic, containing from 2 to 30 carbon atoms, and $m$ is an integer of at least 3; said polyimines can be represented by the formula

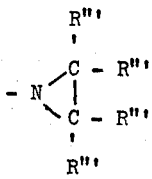

wherein each $R'''$ is hydrogen, alkyl, aryl, or cycloalkyl radical, or combination, such that the total of $R'''$ groups contain up to 20 carbon atoms.

11. A process according to claim 10 wherein said $R_aMX_b$ is $R_aMgX_b$.

12. The process according to claim 11 wherein said polyfunctional treating agent is silicon tetrahalide.

13. The process according to claim 12 wherein said multilithium initiator is a reaction product of divinylbenzene and sec-butyllithium, said modifier is magnesium chloride, and said monomer is 1,3-butadiene.

14. The process according to claim 9 wherein said polymerization reaction is conducted at a temperature of $-50°$ C. to $+150°$ C., under a pressure sufficient to maintain at least a portion of the polymerization reaction mixture in a liquid phase.

15. In a process for preparing gel-free coupled polymers wherein at least one polymerizable monomer is polymerized with a multilithium initiator and wherein a polyfunctional coupling agent containing at least three reactive sites capable of reacting with a lithium-carbon bond in a polymer is added to the polymerization reaction in an effective amount after initiation of said polymerization of said monomer with said multilithium initiator and prior to quenching of said polymerization reaction, thereby coupling said polymer, and wherein said polymerizable monomer is at least one conjugated diene, at least one monovinyl-substituted aromatic compound, or both, the improvement which comprises the addition to the polymerization reaction, after charging of said polymerizable monomer and said multilithium initiator, of a Group IIA metal halide or hydrocarbylmetal halide modifier in an amount effective to broaden the molecular weight distribution of said coupled polymer, wherein the Group IIA metal thereof is magnesium, calcium, strontium, or barium;

wherein said multilithium initiator is a lithium metal adduct of a conjugated diene, a dilithium adduct of a fused ring aromatic hydrocarbon, or is represented by $R'Li_x$ wherein $R'$ is a polyvalent hydrocarbyl radical with a valence equal to the value of $x$.

16. The process according to claim 15 employing as said polymerizable monomer at least one polymerizable conjugated diene and at least one copolymerizable monovinyl-substituted aromatic hydrocarbon, said polymerization is a random polymerization conducted in the presence of a randomizing amount of a polar organic compound randomizing agent, and wherein said modifier is employed in the range of about 0.75 to 10 millimoles of said modifier per equivalent of lithium in said multilithium initiator.

17. The process according to claim 16 employing said multilithium initiator in an amount sufficient to provide at least about 1.5 milliequivalents of lithium per 100 grams of monomer.

18. The process according to claim 17 wherein said polymerizable monomer is butadiene and styrene, said randomizer is potassium tert-butoxide, and said polyfunctional treating agent is silicon tetrachloride.

19. The process according to claim 15 employing as said polymerizable monomer at least one polymerizable conjugated diene, or at least one said conjugated diene and at least one copolymerizable monovinylsubstituted aromatic compound in the absence of a polar organic compound randomizing agent, and wherein said modifier is employed in the range of about 1.25 to 10 millimoles of said modifier per equivalent of lithium in said multilithium initiator.

20. The process according to claim 19 employing said multilithium initiator in an amount sufficient to provide at least about 2.5 milliequivalents of lithium per 100 grams of monomer.

21. The process according to claim 20 wherein said polymerizable monomer is butadiene, and said polyfunctional treating agent is silicon tetrachloride.

* * * * *

UNITED STATES PATENT AND TRADEMARK OFFICE
CERTIFICATE OF CORRECTION

PATENT NO. : 3,879,366
DATED : April 22, 1975
INVENTOR(S) : Charles M. Selman

It is certified that error appears in the above-identified patent and that said Letters Patent are hereby corrected as shown below:

Column 11, claim 6, line 36, delete "5" and insert --- 14 ---.

Signed and Sealed this sixteenth Day of September 1975

[SEAL]

Attest:

RUTH C. MASON
*Attesting Officer*

C. MARSHALL DANN
*Commissioner of Patents and Trademarks*